(12) United States Patent
Smith

(10) Patent No.: US 8,087,862 B1
(45) Date of Patent: Jan. 3, 2012

(54) ELECTRICAL BOX CLIP FOR REPLACING A DAMAGED THREADED TAB

(75) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 350 days.

(21) Appl. No.: 12/462,586

(22) Filed: Aug. 5, 2009

(51) Int. Cl.
F16B 37/04 (2006.01)
H01H 9/02 (2006.01)

(52) U.S. Cl. .......................... 411/174; 174/54
(58) Field of Classification Search .............. 411/174, 411/970, 21; 174/54, 58
See application file for complete search history.

(56) References Cited

U.S. PATENT DOCUMENTS

| 2,328,757 | A | * | 9/1943 | Tinnerman | 49/463 |
|---|---|---|---|---|---|
| 2,661,821 | A | * | 12/1953 | Tinnerman | 403/21 |
| 2,804,116 | A | * | 8/1957 | Van Niel et al. | 411/247 |
| 2,982,324 | A | * | 5/1961 | Zerhan, Jr. | 411/247 |
| 3,880,535 | A | * | 4/1975 | Durham et al. | 403/241 |
| 4,317,954 | A | * | 3/1982 | Giammarra | 174/53 |
| 5,865,559 | A | * | 2/1999 | Yang | 403/322.1 |
| 2008/0217054 | A1 | | 9/2008 | Walton | 174/545 |

* cited by examiner

*Primary Examiner* — Flemming Saether
(74) *Attorney, Agent, or Firm* — Fattibene and Fattibene LLC; Paul A. Fattibene

(57) ABSTRACT

A clip having a U-shaped body and a cantilevered replacement tab with a threaded hole. The clip replaces damaged threaded tabs on a metal electrical box. The U-shaped body of the clip is slid over the wall of an electrical box after the damaged threaded tab is removed. A cantilevered replacement tab extends from the U-shaped body of the clip having a replacement threaded hole therein for receiving a machine screw. The machine screw holds an electrical outlet within the electrical box. The cantilevered replacement tab creates a moment arm causing an attached tooth to bite into a surface of the electrical box. The clip is thereby securely held within the electrical box and is prevented from sliding off of the box as the electrical outlet is drawn into the box by the machine screw. The present invention provides an improved clip for the replacement of a tab in a damaged electrical box and eliminates the need for replacing the electrical box.

8 Claims, 5 Drawing Sheets

US 8,087,862 B1

ELECTRICAL BOX CLIP FOR REPLACING A DAMAGED THREADED TAB

FIELD OF THE INVENTION

The present invention relates in general to the repair of electrical boxes, and in particular to the replacement of a damaged threaded tab for attaching an electrical outlet or receptacle to a metal electrical box.

BACKGROUND OF THE INVENTION

Electrical boxes have been used for many years to receive an electrical receptacle, such as an electrical outlet. The electrical outlet is typically held in the electrical box by machine screws. The machine screws are threaded into tabs extending from the top and bottom of the electrical box. Through time and age, these tabs often become damaged. For example, threads may become stripped or a machine screw will become corroded or break off within the threaded hole of the tab. When the tab with the threaded hole becomes damaged, it is often very difficult to secure electrical outlets or other receptacles within the electrical box. As a result it may become necessary to replace the electrical box. It is often very difficult and time-consuming to replace the electrical box.

Prior devices have been developed to repair electrical boxes. One such device is a gang box clip used to repair non-metallic electrical wall boxes such as disclosed in US Patent Publication 2008/0217054, published Sep. 11, 2008, entitled "Gang Box Clip" and invented by Michael Peter Walton. Therein disclosed is a clip used for plastic or non-metallic electrical wall boxes. The clip provides a new threaded opening to receive a machine screw with the new threaded opening taking the place of the original worn or damaged threaded opening or hub of the plastic electrical wall box. While this clip aids in the repair of a non-metallic or plastic electrical wall box, it is not well suited for repairing a metal electrical box. This prior clip may be pulled away from the electrical box or loosen when the screw is threaded into the clip drawing the electrical receptacle or outlet inward while at the same time pulling the clip away from the plastic or non-metallic electrical box. Therefore, while the clip disclosed in US Patent Application Publication 2008/0217054 may be suitable for some applications, and in particular for use on a non-metallic electrical wall box, there is a need for an improved clip that is more secure and is specifically better suited for use on a metal electrical box.

SUMMARY OF THE INVENTION

The present invention provides a device that permits the easy repair of a damaged electrical box. When a threaded tab is damaged and removed from the electrical box, a U-shaped clip is slid over the top or bottom wall of the electrical box. The U-shaped clip has a replacement tab with a replacement threaded hole cantilevered from the U-shaped clip. An inside tooth and an outside tooth formed within the U-shaped clip securely grip the inside and outside surfaces of the top or bottom wall of the electrical box. The cantilevered replacement tab, with the replacement threaded hole, after being mounted on the top or bottom wall of the electrical box and pulled outward when threading in a screw, creates a moment arm causing the inside and outside teeth to bite into the top or bottom wall of the electrical box. This prevents the U-shaped clip from sliding off or being pulled off of the top or bottom wall of the electrical box.

Accordingly, it is an object of the present invention to provide a replacement threaded tab for a damaged electrical box.

It is a further object of the present invention to provide a clip that slides on easily, but yet will not be pulled away from the electrical box upon securing an electrical receptacle or outlet.

It is an advantage of the present invention that the need to replace an electrical box due to a damaged threaded tab is prevented.

It is a further advantage of the present invention that the clip becomes more secure as it is pulled outward by a screw upon attaching an electrical receptacle or outlet.

It is a feature of the present invention that the clip has a cantilevered replacement tab.

It is another feature of the present invention that an inner and outer tooth bites into the inside and outside surface of a top or bottom wall of an electrical box as force is applied to the cantilevered replacement tab.

These and other objects, advantages, and features will become more readily apparent in view of the following detailed description.

DETAILED DESCRIPTION OF THE PREFERRED EMBODIMENT

Figure 1:
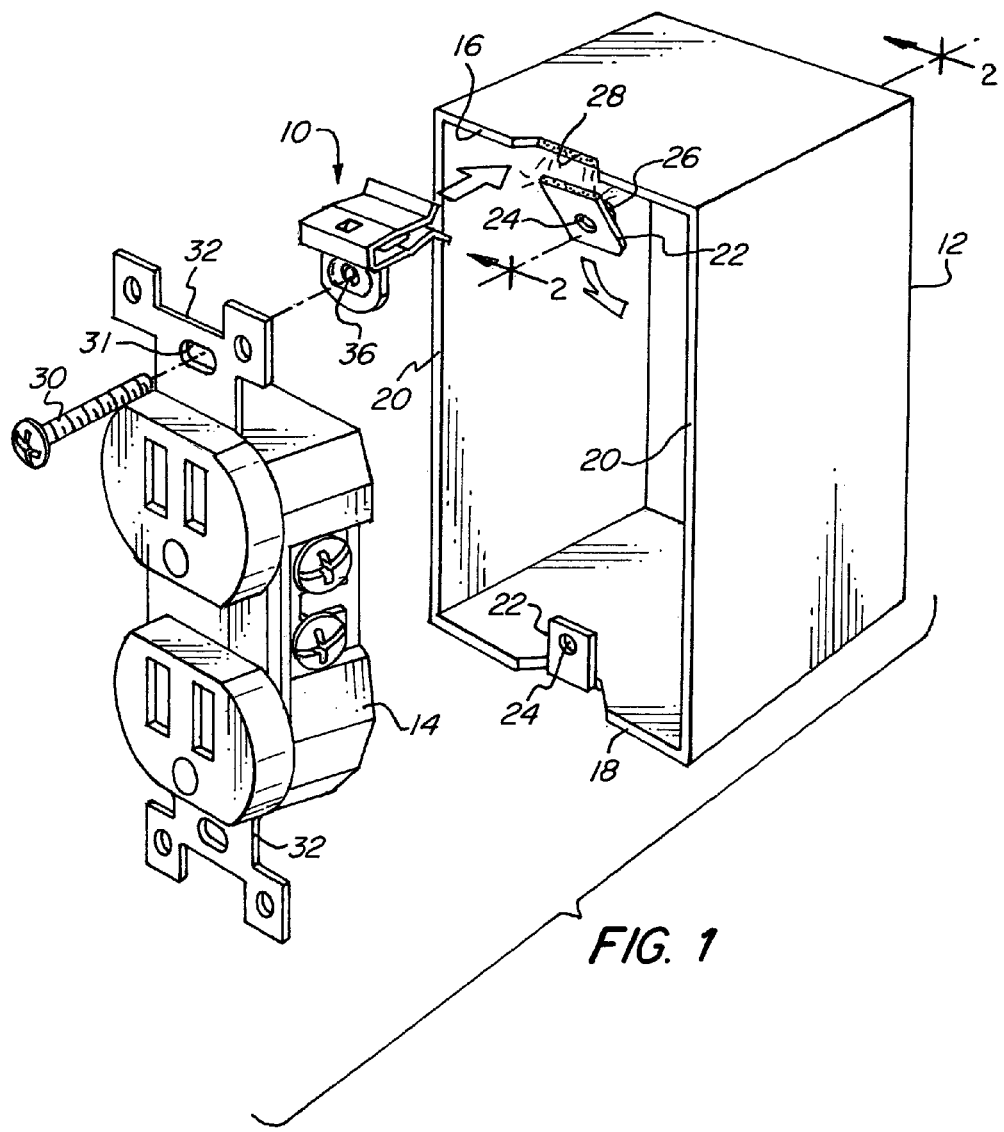
FIG. 1 is a perspective partial exploded view illustrating the use of the present invention.

FIG. 1 is a perspective view illustrating the use of the clip 10 of the present invention. An electrical box 12 typically receives an electrical receptacle, such as an electrical outlet 14. The electrical box 12 has a top wall 16 and a bottom wall 18 connected by side walls 20. Original threaded tabs 22 are placed on the top and bottom walls 16 and 18 of the electrical box 12. The threaded tabs 22 have threaded holes 24 therein. Illustrated in the top threaded tab 22 is a portion of a broken screw 26. A screw may become stuck within the threaded tab 22 due to corrosion, age, wear, or other similar reasons. Over time and use, the threaded holes 24 may become stripped. As a result of the broken or stuck screw 26 or stripped threads in the threaded hole 24, the top tab 22 is broken away by back and forth bending, forming a front tab surface 28. The clip 10 of the present invention slides onto the top wall 16 of the electrical box 12. The electrical outlet 14 may be secured by machine screw 30 placed through an opening 31 in an ear 32 of the electrical outlet 14 and threaded into the clip 10. The electrical outlet 14 can then be readily drawn into the electrical box 12 as the machine screw 30 is threaded into the replacement tab threaded hole 36 of the clip 10 so as to be securely retained therein.

Figure 2:
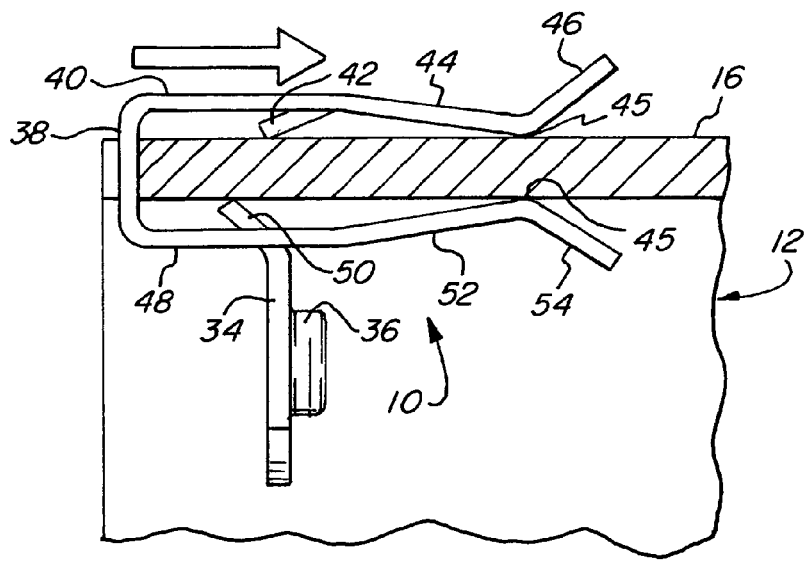
FIG. 2 is a cross section taken along line 2-2 in FIG. 1, illustrating the placement of the present invention on an electrical box.

FIG. 2 more clearly illustrates the placement of the clip 10 onto the top wall 16 of the electrical box. The U-shaped clip 10 has a replacement tab 34 with a replacement threaded hole 36 that is cantilevered from the U-shaped body of the clip 10. The U-shaped clip 10 may be made of any material that is sufficiently strong and resilient, and is preferably made of spring steel. The U-shaped body of the clip 10 has a front portion 38 and an outside or first leg having an outside planar portion 40, with an outside tooth 42 extending therefrom and an adjacent outside inwardly bent portion 44 and an adjacent outside outwardly bent portion 46. On the other end of the front portion 38 is an inside or second leg having an inside planar portion 48. Extending from the inside planar portion 48 is the cantilevered replacement tab 34 and an inside tooth 50. Adjacent the inside planar portion 48 is the inside inwardly bent portion 52 and adjacent thereto the inside outwardly bent portion 54.

The outside outwardly bent portion 46 and the inside outwardly bent portion 54 aid in guiding the clip 10 onto the top wall 16 of the electrical box. The outside inwardly bent portion 44 and the inside inwardly bent portion 52 provides contact points 45 on the top wall 16. The outside tooth 42 and the inside tooth 50 are angled so as to permit clip 10 to be slid onto the top wall 16 and prevent the removal of the clip 10 from the top wall 16 of the electrical box.

Figure 3:
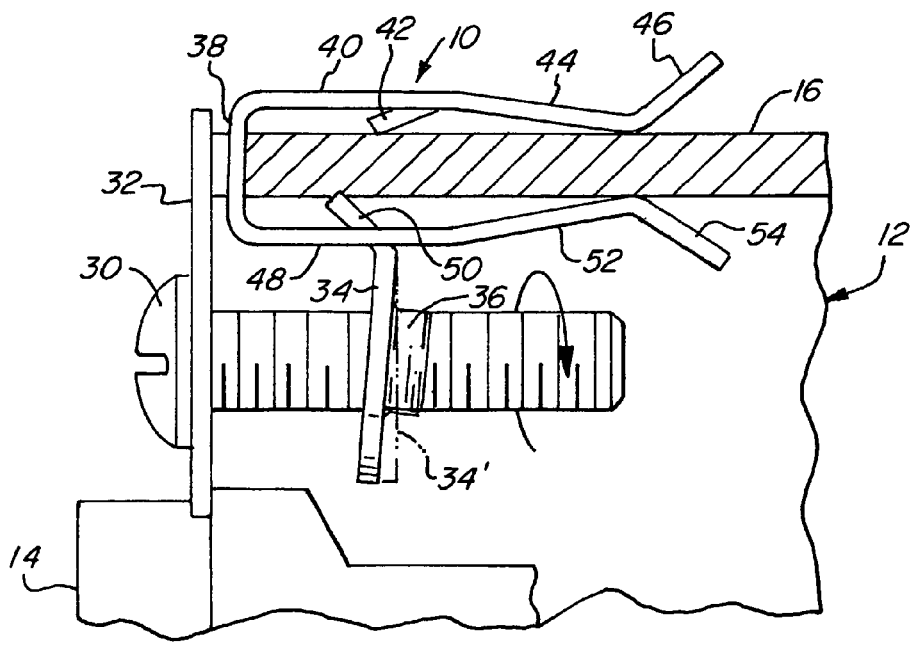
FIG. 3 is a cross-section illustrating the securing of the present invention on an electrical box.

FIG. 3 more clearly illustrates the operation of the clip 10 and how it is securely held on the top wall 16 of the electrical box so as to prevent its unintentional removal. As the machine screw 30 is threaded into the replacement threaded hole 36 on the replacement tab 34 so as to draw the electrical outlet 14 into the electrical box 16, the cantilevered replacement tab 34 being pulled outward by the machine screw 30 causes a moment arm rotating the inside tooth 50 upward or clockwise biting into the inside surface of the top wall 16 of the electrical box. Accordingly, the clip 10 is prevented from being pulled away or loosened from the top wall 16 as the machine screw 30 draws the electrical outlet 14 in to the electrical box. The machine screw 30 is placed within an opening in the ear 32 of the electrical outlet 14. Phantom lines 34' illustrate the original position of the replacement tab 34 and that the replacement tab 34 may rotate slightly clockwise as the electrical outlet 14 is drawn into the electrical box 12, causing the tooth 50 to bite into the inside surface of the top wall 16 of the electrical box.

Accordingly it should be appreciated that the present invention, by providing a clip 10 that can be securely fastened to an electrical box 12 and that becomes more securely fastened as an electrical receptacle or outlet 14 is drawn into the electrical box 12 by a machine screw 30 assures that the clip 10 cannot be unintentionally or inadvertently loosened. The clip 10 of the present invention is an improvement over prior clips utilized for a similar purpose and prevents electrical receptacles or outlets 14 from become loose through continued use. The unique structure of the clip 10 of the present invention results in the clip 10 becoming more secure as force is applied to the replacement tab 34.

Figure 4:
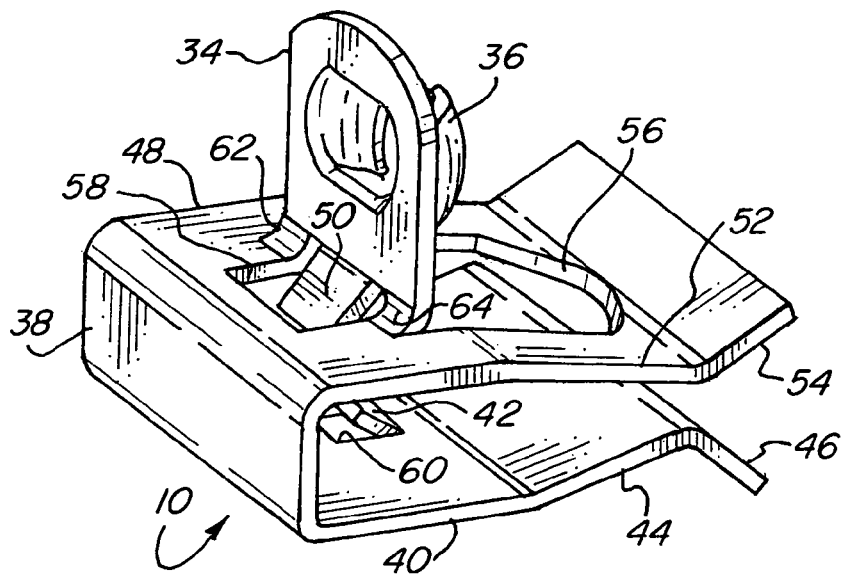
FIG. 4 is a perspective view illustrating the present invention.

FIG. 4 is a perspective view more clearly illustrating the shape of the clip 10 of the present invention and the openings created by the formation of the replacement tab 34, outside box tooth 42, and inside box tooth 50. Replacement tab opening 56 is formed by the cutting out or blanking of the inside box inwardly bent portion forming replacement tab 34. Inside box tooth opening 58 is formed by cutting out or blanking forming inside box tooth 50. Outside box tooth opening 60 is formed by cutting out or blanking forming outside box tooth 42. The replacement tap 34 has a lateral width larger than the lateral width of inside box tooth 50 and inside box tooth opening 58. A first side bend 62 is formed between an outside edge of the replacement tab 34 and an edge of the inside box tooth opening 58. Similarly a second side bend 64 is formed between the other outside edge of the replacement tab 34 and the other edge of the inside box tooth opening 58. The inside box tooth is attached to the replacement tab 34.

Figure 5:
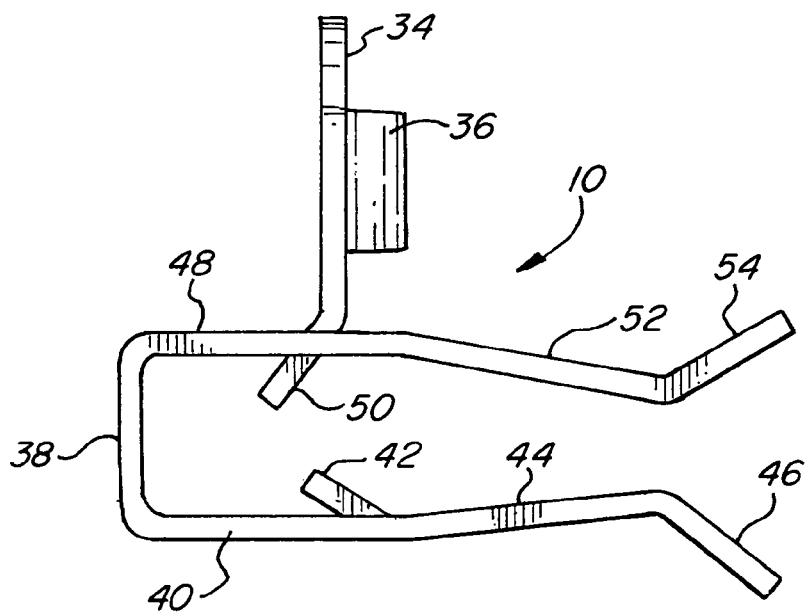
FIG. 5 is a side elevational view illustrating the present invention.

FIG. 5 is a front elevational view that more clearly illustrates the cantilevered replacement tab 34 and the teeth 42 and 50. FIG. 5 also more clearly illustrates that the teeth 42 and 50 are longitudinally offset. That is along the longitudinal dimension of the clip 10 the tooth 50 is closer to the front portion 38 than the tooth 42.

Figure 6:
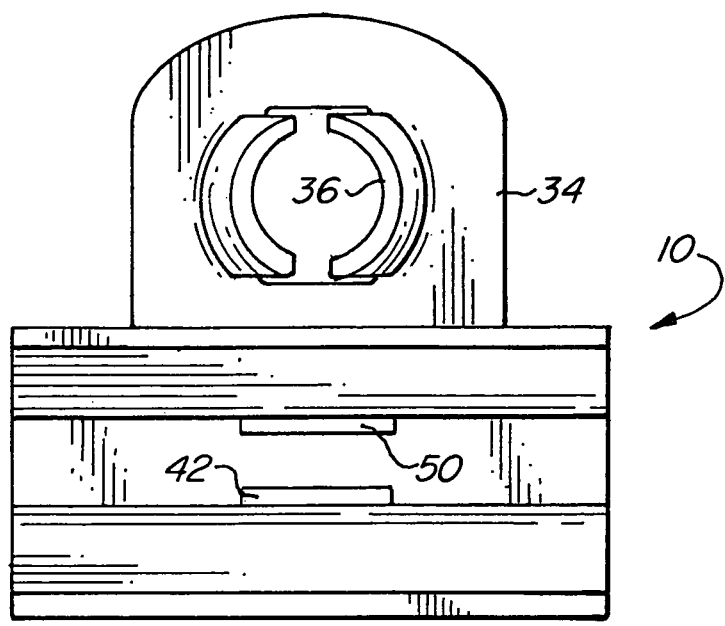
FIG. 6 is a front elevational view illustrating the present invention.

FIG. 6 is a front elevational view more clearly illustrating the shape of the teeth 42 and 50 as well as the replacement threaded hole 36. FIG. 6 also more clearly illustrates that the teeth 43 and 50 are laterally in the same position. That is along the lateral dimension of the clip 10 the tooth 42 is laterally directly opposite the lateral position of the tooth 50.

Figure 7:
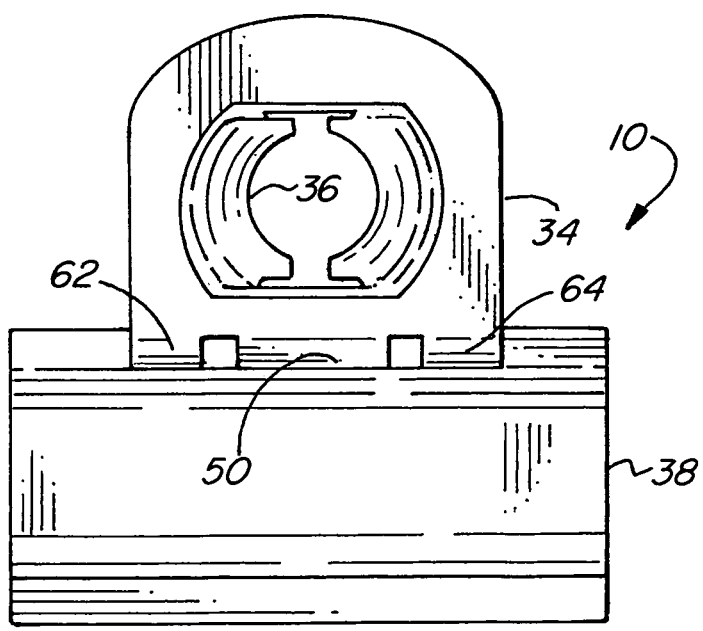
FIG. 7 is a rear elevational view illustrating the present invention.

FIG. 7 is a rear elevational view clearly illustrating the shape of the threaded hole 36 and the front portion 38. Additionally, more clearly illustrated is tooth 50 and first and second side bends 62 and 64.

Figure 8:
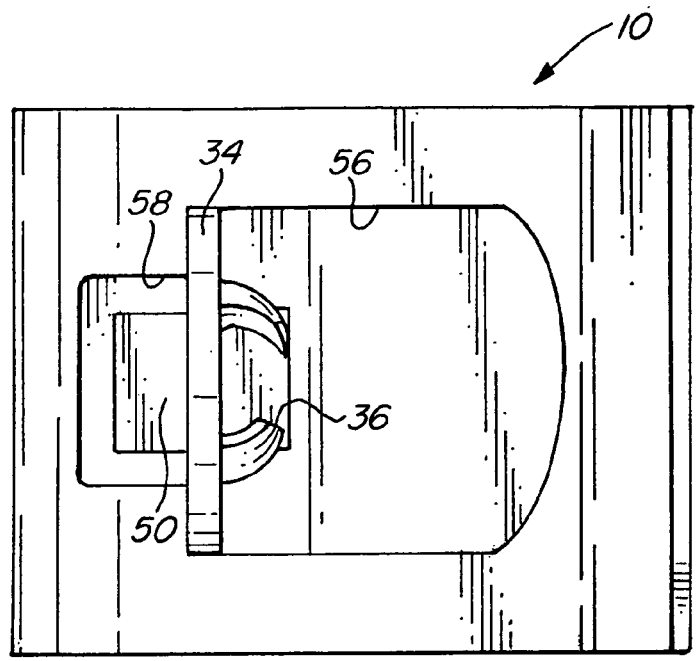
FIG. 8 is a bottom plan view illustrating the present invention.

FIG. 8 is a top plan view more clearly illustrating the shape of the clip and the inside box tooth 50 and the inside box tooth opening 58 as well as the replacement tab 34, replacement treaded hole 36, and replacement tab opening 56.

Figure 9:
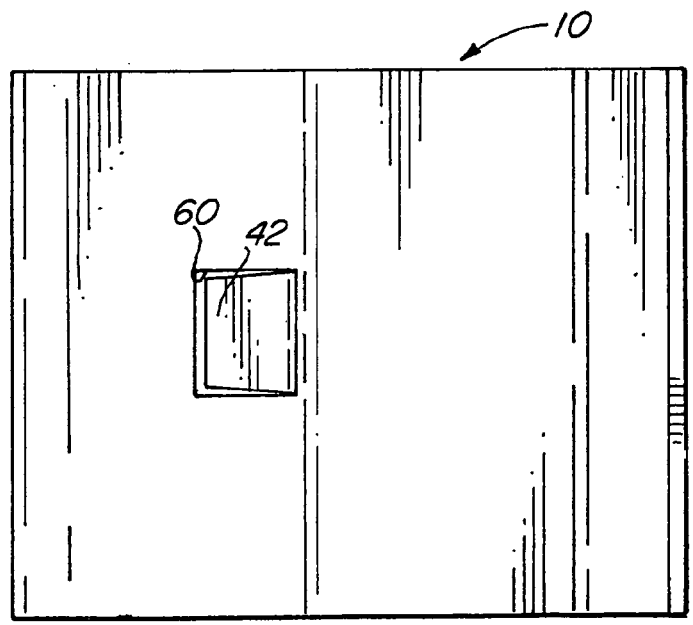
FIG. 9 is a top plan view illustrating the present invention.

FIG. 9 is a bottom plan view more clearly illustrating the shape of the outside box tooth 42 and the outside box tooth opening 60.

The clip of the present invention greatly facilitates the repair of a damaged electrical box and in particular the replacement of a threaded tab in a metal electrical box that has been stripped, damaged, or that has a screw broken off therein. The clip of the present invention has a structure that permits the clip to be more securely retained on the top or bottom walls of the electrical box as the electrical receptacle or outlet is drawn into the electrical box by the machine screw threaded into the clip. While the present invention is relatively simply, it is a great advantage to an electrician and saves considerable time and avoids the need to replace a damaged electrical box. The present invention provides a more secure clip than has previously been available and therefore is an advancement of the art.

Although the preferred embodiment has been illustrated and described, it will be obvious to those skilled in the art that various modifications may be made without departing from the spirit and scope of this invention.

What is claimed is:

1. A clip for repairing a damaged electrical box comprising:
    a U-shaped body portion having a first and second leg;
    a replacement tab cantilevered from the first leg of said U-shaped body portion;
    a first tooth attached to said cantilevered replacement tab; and
    a threaded hole placed within said cantilevered replacement tab,
    whereby when a machine screw is threaded into said threaded hole and an electrical receptacle is drawn inward a moment arm is formed causing the first tooth to bite into a surface of the electrical box securely retaining the clip therein.

2. A clip for repairing a damaged electrical box as in claim 1 further comprising:
   a second tooth extending from the second leg.
3. A clip for repairing a damaged electrical box as in claim 2 wherein:
   the first tooth and the second tooth are in the same lateral position.
4. A clip for repairing a damaged electrical box as in claim 3 wherein:
   the first tooth and the second tooth are longitudinally offset.
5. A clip for repairing a damaged electrical box as in claim 1 wherein:
   the first leg comprises a planar portion adjacent an inwardly bend portion adjacent an outwardly bent portion; and
   the second leg comprises a planar portion adjacent an inwardly bend portion adjacent an outwardly bent portion.
6. A clip for repairing a damaged electrical box as in claim 1 wherein:
   the clip is made of spring steel.
7. A clip used for repairing a metal electrical box having a damaged threaded tab comprising:
   a U-shaped body portion having a first and second leg;
   a replacement tab cantilevered from the first leg of said U-shaped body portion;
   a tab opening formed in the first leg of said U-shaped body portion;
   a first tooth attached to said cantilevered replacement tab and extending out of a plane of the first leg towards the second leg;
   an inside box tooth opening formed in the first leg of said U-shaped body portion;
   a first side bend formed adjacent an edge of said replacement tab and an edge of said inside box tooth opening;
   a second side bend formed adjacent an opposing edge of said replacement tab and an opposing edge of said inside box tooth opening;
   a second tooth extending out of a plane of the second leg towards the first leg;
   an outside box tooth opening formed in the second leg of said U-shaped leg; and
   a threaded hole placed within said cantilevered replacement tab,
   whereby when a machine screw is threaded into said threaded hole and an electrical receptacle is drawn inward, a moment arm is formed causing the tooth to bite into a surface of the electrical box securely retaining the clip therein.
8. A method of replacing a damaged threaded tab on a metal electrical box comprising the steps of:
   braking off the damaged threaded tab from a wall of the metal electrical box forming a front tab surface;
   sliding a U-shaped clip having a cantilevered replacement tab with an attached tooth and a replacement threaded hole onto the wall of the metal electric box adjacent the front tab surface;
   placing a machine screw through an opening in an ear of an electrical receptacle; and
   threading the machine screw into the replacement threaded hole,
   whereby the electrical receptacle is drawn into the metal electrical box and the attached tooth on the cantilevered replacement tab is caused to bite into the wall of the metal electrical box preventing the U-shaped clip from sliding off of the wall of the metal electrical box.

* * * * *